United States Patent
Yang

(10) Patent No.: US 8,761,314 B2
(45) Date of Patent: Jun. 24, 2014

(54) METHOD OF HANDLING FREQUENCY-DOMAIN INTERPOLATION AND RELATED FREQUENCY-DOMAIN INTERPOLATOR

(71) Applicant: ALi (Shanghai) Corporation, Shanghai (CN)

(72) Inventor: Yong Yang, Shanghai (CN)

(73) Assignee: ALi (Shanghai) Corporation, Shanghai (CN)

( * ) Notice: Subject to any disclaimer, the term of this patent is extended or adjusted under 35 U.S.C. 154(b) by 0 days.

(21) Appl. No.: 13/663,478

(22) Filed: Oct. 30, 2012

(65) Prior Publication Data

US 2014/0064414 A1    Mar. 6, 2014

(30) Foreign Application Priority Data

Sep. 4, 2012    (CN) .......................... 2012 1 0324105

(51) Int. Cl.
*H04L 27/06* (2006.01)
(52) U.S. Cl.
USPC .......................................... 375/340; 375/260
(58) Field of Classification Search
USPC .......... 375/229, 260, 285, 316, 340, 349, 350
See application file for complete search history.

(56) References Cited

U.S. PATENT DOCUMENTS

| 8,175,204 B2 | 5/2012 | Kawauchi | |
|---|---|---|---|
| 2006/0062322 A1* | 3/2006 | Namgoong et al. | 375/285 |
| 2012/0243596 A1* | 9/2012 | Lovell | 375/229 |

FOREIGN PATENT DOCUMENTS

EP    2259517    12/2010

\* cited by examiner

*Primary Examiner* — Leon-Viet Nguyen
(74) *Attorney, Agent, or Firm* — Winston Hsu; Scott Margo

(57) ABSTRACT

A frequency-domain interpolator for estimating a plurality of channels corresponding to a plurality of subcarriers comprises an edge pilot estimation unit, for generating a plurality of pilots according to a plurality of input pilots, a pilot interval ratio and a complexity parameter; a first selection unit, for selecting a plurality of pilot groups from the plurality of pilots according to the pilot interval ratio and the complexity parameter; a second selection unit, for generating a plurality of coefficient groups corresponding to the plurality of channels according to a channel profile and a used pilot interval, wherein each of the plurality of coefficient groups corresponds to a set of the plurality of channels; and a filter unit, for generating the plurality of channels according the plurality of pilot groups, the plurality of coefficient groups, and a relation between the plurality of pilot groups and the plurality of coefficient groups.

18 Claims, 12 Drawing Sheets

METHOD OF HANDLING FREQUENCY-DOMAIN INTERPOLATION AND RELATED FREQUENCY-DOMAIN INTERPOLATOR

BACKGROUND OF THE INVENTION

1. Field of the Invention

The present invention relates to a method of handling frequency-domain interpolation and a frequency-domain interpolator, and more particularly, to a frequency-domain interpolation method and a frequency-domain interpolator capable of trading complexity and performance and being applied to various pilot intervals.

2. Description of the Prior Art

Orthogonal frequency-division multiplexing (OFDM) is widely adopted in modern communication systems due to its high spectrum efficiency and resistance to multipath fading, for transmitting and receiving signals to increase throughput of the communication systems. Examples of the communication systems are wireline communication systems such as asymmetric digital subscriber line (ADSL) and power line communication (PLC), and wireless communication systems such as wireless local area network (WLAN), Digital Video Broadcasting (DVB) and Long Term Evolution-advanced (LTE-A).

In general, when a communication system employing the OFDM operates, a part of the subcarriers is used for channel estimation by a transmitter of the communication system, wherein the subcarriers are available subcarriers used by the transmitter and a receiver of the communication system. Thus, the receiver can obtain channels (e.g., channel frequency response (CFR)) corresponding to all the subcarriers via the part of subcarriers. As a result, data transmitted via the subcarriers can be recovered by using the estimated channels. In detail, the transmitter arranges pilots known by both the transmitter and the receiver on the part of the subcarriers (i.e., pilot subcarriers). For example, the pilots can be arranged equally spaced on the subcarriers, and the data are arranged on the rest of the subcarriers (i.e., data subcarriers). Thus, when the transmitter transmits an OFDM signal (i.e., on the time-domain) composed of the subcarriers, the pilots and the data are both transmitted to the receiver. After receiving the OFDM signal, the receiver not only can use the pilots for estimating the channels corresponding to the pilot subcarriers, but can also for estimating the channels corresponding to the data subcarriers. Thus, after estimating the channels corresponding to the data subcarriers, the receiver can perform signal processing techniques such as equalization, demodulation, etc., by using the estimated channels, to recover the data on the data subcarriers.

However, when performing the channel estimation, especially performing frequency-domain interpolation in the channel estimation, it is hard to trade between hardware cost and edge performance, wherein the edge performance is performance of edge of the subcarriers. The edge of the subcarriers is easily affected by interference. For example, an order of the frequency-domain interpolation should be increased, to reduce inband interference and outband interference. But, the hardware cost is increased and the edge performance is decreased due to the increased order. Oppositely, the order of the frequency-domain interpolation can be decreased to reduce the hardware cost and increase the edge performance. But, the inband interference and the outband interference are increased due to the decreased order. Thus, it is hard for the receiver to trade between the inband interference, the inband interference, the hardware cost and the edge performance. On the other hand, the transmitter can adjust a pilot interval (i.e., density of the pilots) which is a distance between neighboring pilots, according to causes such as a channel profile, an amount of overhead, and etc. For example, although the pilot interval is 3 in the DVB-Terrestrial (DVB-T) system, i.e., there are three data between every two neighboring pilots, the pilot interval can be 3, 6, 12 or 24 in the new DVB-T system, i.e., the DVB-T2 system. Correspondingly, the receiver needs to process the OFDM signal transmitted with various pilot intervals. Thus, realizing the frequency-domain interpolation with a low complexity in the receiver in the DVB-T2 system is an important problem to be solved.

SUMMARY OF THE INVENTION

The present invention therefore provides a method of handling frequency-domain interpolation and a frequency-domain interpolator to solve the abovementioned problem.

A frequency-domain interpolator, utilized in a receiver of an orthogonal frequency-division multiplexing (OFDM) system, for estimating a plurality of channels corresponding to a plurality of subcarriers is disclosed. The frequency-domain interpolator comprises an edge pilot estimation unit, for receiving a plurality of input pilots on the plurality of subcarriers, to generate a plurality of pilots according to the plurality of input pilots, a pilot interval ratio and a complexity parameter, wherein the plurality of pilots comprise the plurality of input pilots and a plurality of edge pilots; a first selection unit, coupled to the edge pilot estimation unit, for receiving the plurality of pilots, to select a plurality of pilot groups from the plurality of pilots according to the pilot interval ratio and the complexity parameter; a second selection unit, for generating a plurality of coefficient groups corresponding to the plurality of channels according to a channel profile and a used pilot interval, wherein each of the plurality of coefficient groups corresponds to a set of the plurality of channels; and a filter unit, coupled to the first selection unit and the second selection unit, for receiving the plurality of pilot groups and the plurality of coefficient groups, to generate the plurality of channels according to the plurality of pilot groups, the plurality of coefficient groups, and a relation between the plurality of pilot groups and the plurality of coefficient groups.

A method of handling frequency-domain interpolation is disclosed. The method is utilized in a receiver of an orthogonal frequency-division multiplexing (OFDM) system, for estimating a plurality of channels corresponding to a plurality of subcarriers. The method comprises receiving a plurality of input pilots on the plurality of subcarriers, to generate a plurality of pilots according to the plurality of input pilots, a pilot interval ratio and a complexity parameter, wherein the plurality of pilots comprise the plurality of input pilots and a plurality of edge pilots; receiving the plurality of pilots, and selecting a plurality of pilot groups from the plurality of pilots according to the pilot interval ratio and the complexity parameter; generating a plurality of coefficient groups corresponding to the plurality of channels according to a channel profile and a used pilot interval, wherein each of the plurality of coefficient groups corresponds to a set of the plurality of channels; and receiving the plurality of pilot groups and the plurality of coefficient groups, to generate the plurality of channels according to the plurality of pilot groups, the plurality of coefficient groups, and a relation between the plurality of pilot groups and the plurality of coefficient groups.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
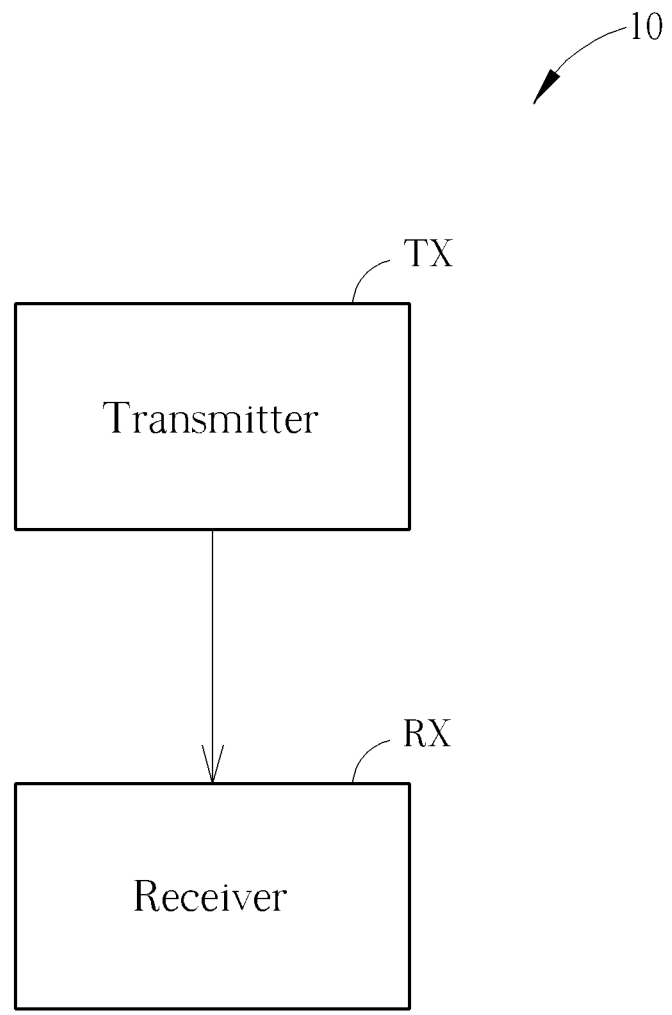
FIG. 1 is a schematic diagram of a communication system according to an example of the present invention.

Please refer to FIG. 1, which is a schematic diagram of a communication system 10 according to an example of the present invention. The communication system 10 can be any communication system employing orthogonal frequency-division multiplexing (OFDM), and is simply composed of a transmitter TX and a receiver RX. In FIG. 1, the transmitter TX and the receiver RX are simply utilized for illustrating the structure of the communication system 10. For example, the communication system 10 can be wireline communication systems such as asymmetric digital subscriber line (ADSL) and power line communication (PLC), and wireless communication systems such as wireless local area network (WLAN), Digital Video Broadcasting (DVB) system and Long Term Evolution-advanced (LTE-A) system, wherein the DVB system includes DVB-Terrestrial (DVB-T) system and DVB-T2 system. Besides, the transmitter TX and the receiver RX can be installed in mobile phones, laptops, tablet computers, electronic books, portable computer systems, and are not limited herein.

Figure 2:
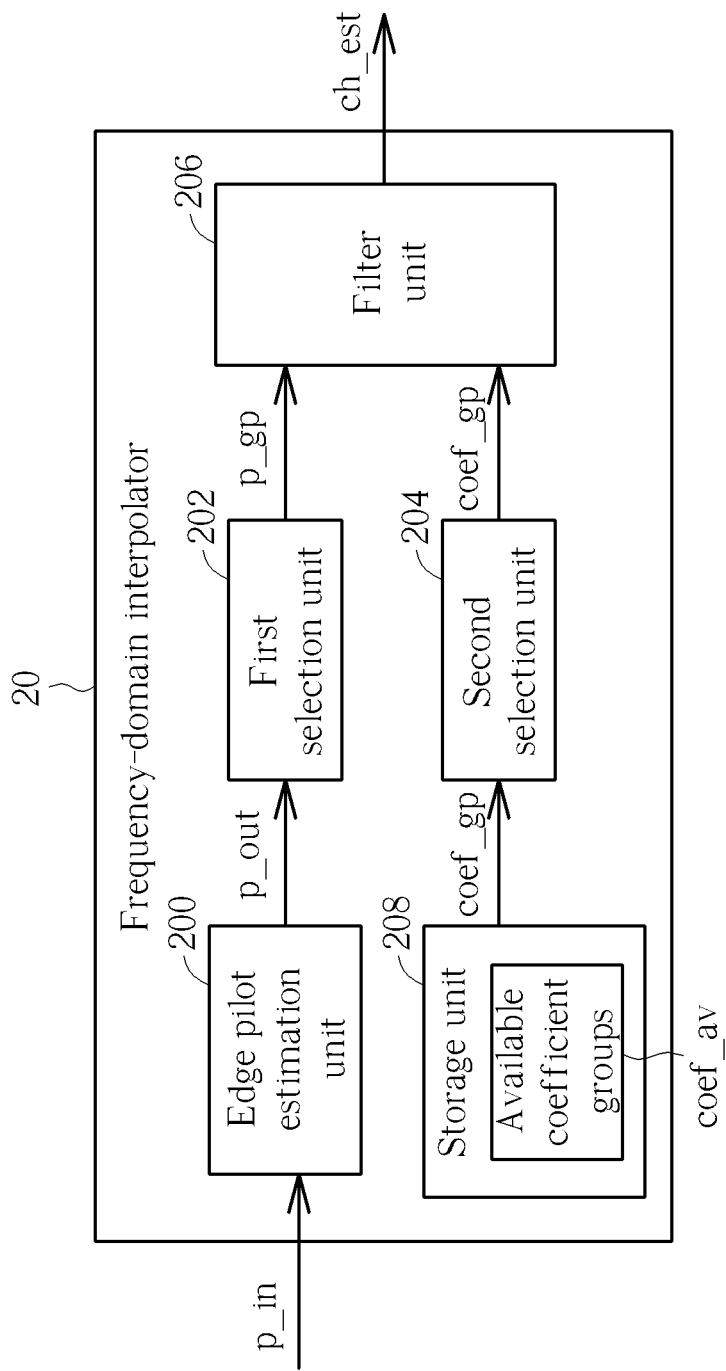
FIG. 2 is a schematic diagram of a frequency-domain interpolator according to an example of the present invention.

Please refer to FIG. 2, which is a schematic diagram of a frequency-domain interpolator 20 according to an example of the present invention. The frequency-domain interpolator 20 can be used in the receiver RX shown in FIG. 1, for performing frequency-domain interpolation in channel estimation. The frequency-domain interpolator 20 includes an edge pilot estimation unit 200, a first selection unit 202, a second selection unit 204, and a filter unit 206. In detail, the edge pilot estimation unit 200 receives a plurality of input pilots p_in on a plurality of subcarriers, to generate a plurality of pilots p_out according to the plurality of input pilots p_in, a pilot interval ratio and a complexity parameter N, wherein the plurality of pilots p_out include the plurality of input pilots p_in and a plurality of edge pilots. The first selection unit 202 which is coupled to the edge pilot estimation unit 200 receives the plurality of pilots p_out, selects a plurality of pilot groups p_gp from the plurality of pilots p_out according to the pilot interval ratio and the complexity parameter N. The second selection unit 204 generates a plurality of coefficient groups coef_gp corresponding to a plurality of channels (i.e., channels to be estimated) according to a channel profile and a used pilot interval, wherein each of the plurality of coefficient groups coef_gp corresponds to a set of the plurality of channels. The filter unit 206 which is coupled to the first selection unit 202 and the second selection unit 204 receives the plurality of pilot groups p_gp and the plurality of coefficient groups coef_gp, to generate a plurality of channels (i.e., estimated channels) ch_est according to the plurality of pilot groups p_gp, the plurality of coefficient groups coef_gp, and a relation between the plurality of pilot groups p_gp and the plurality of coefficient groups coef_gp. Thus, the receiver RX can perform operations such as equalization, demodulation, etc., by using the plurality of channels ch_est, to recover data. Preferably, the frequency-domain interpolator 20 further includes a storage unit 208 coupled to the second selection unit 204. The storage unit 208 stores available coefficient groups coef_av as options for the second selection unit 204. The plurality of coefficient groups coef_gp are selected from the available coefficient groups coef_av according to the channel profile and the used pilot interval. Note that the available coefficient groups coef_av are coefficients calculated and stored in the storage unit 208 in advance according to possible channel profiles and possible pilot intervals. Thus, the frequency-domain interpolator 20 can access the available coefficient groups coef_av rapidly and conveniently according to its needs.

Figure 3:
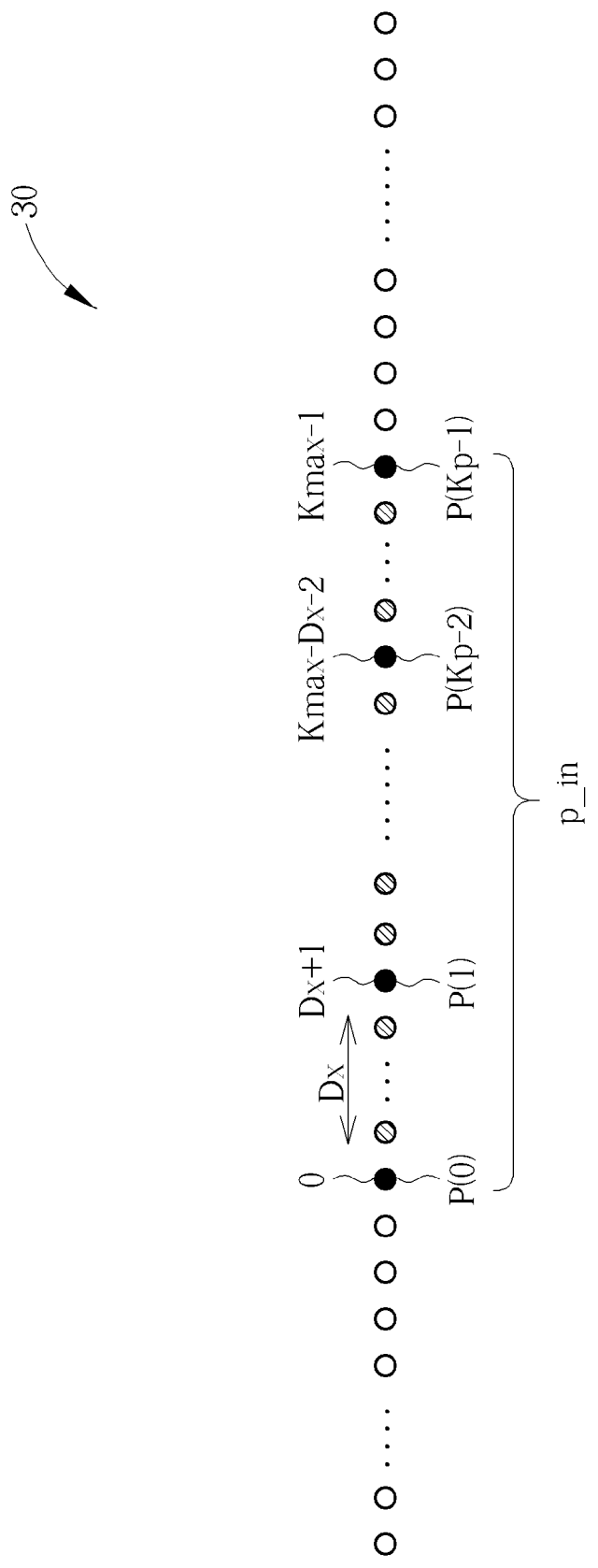
FIG. 3 is a schematic diagram of an arrangement of subcarriers according to an example of the present invention.

Please refer to FIG. 3, which is a schematic diagram of an arrangement of subcarriers according to an example of the present invention. FIG. 3 is used for illustrating a subcarrier arrangement 30 of an OFDM signal. As shown in FIG. 3, the OFDM signal includes Kmax available subcarriers and unused subcarriers which are both represented by circles, wherein 0-(Kmax−1) are indices of the available subcarriers. In detail, subcarriers (i.e., data subcarriers) used for arranging data are represented by circles filled with grid lines, and subcarriers (i.e., pilot subcarriers P(0)-P(Kp−1)) used for arranging Kp pilots p_in are represented by solid circles, wherein P(0)-P(Kp−1) are indices of the pilot subcarriers. Besides, unused subcarriers in guard bands are represented by empty circles, and Dx is an actual pilot interval. Thus, a relation between the indices of the pilot subcarriers and the indices of the available subcarriers can be represented as follows: $P(0)=0$, $P(1)=(Dx+1)$, $P(2)=2(Dx+1)$, ..., $P(Kp-1)=Kmax-1$. According to the above description, when the transmitter TX prepares to transmit the OFDM signal composed of the subcarriers to the receiver RX, the transmitter TX can arrange the pilots and the data on the subcarriers according to the subcarrier arrangement 30. Correspondingly, the receiver RX processes the pilots and the data on the subcarriers according to the subcarrier arrangement 30.

Please note that, the actual pilot interval Dx can be any positive integer, i.e., the present invention can be applied to various pilot intervals. For example, the present invention can be applied to cases where Dx is 3, 6, 12 or 24 which are the pilot intervals described in the DVB-T2 system. Besides, the transmitter TX does not need to start from the 0th subcarrier when arranging the pilots, i.e., $P(0)$ may not be 0. On the other hand, the last pilot may not be arranged on the last available subcarrier, i.e., $P(Kp-1)$ may not be $(Kmax-1)$, according to a relation between Kmax and Dx, e.g., whether $(Kmax-1)$ is divisible by (Dx+1). Considering the subcarrier arrangement 30, since the pilots are arranged on both the first subcarrier (with the index 0) and the last subcarrier (with the index (Kmax−1)), it can be inferred that (Kmax−1) is divisible by (Dx+1).

After the OFDM signal is received and processed by frontend components of the receiver RX, the edge pilot estimation unit 200 can obtain the pilots on the pilot subcarriers P(0)-P(Kp−1), i.e., the plurality of input pilots p_in shown in FIG. 2. Then, the edge pilot estimation unit 200 generates the plurality of pilots p_out according to the plurality of input pilots p_in, the pilot interval ratio and the complexity parameter.

Figure 4:
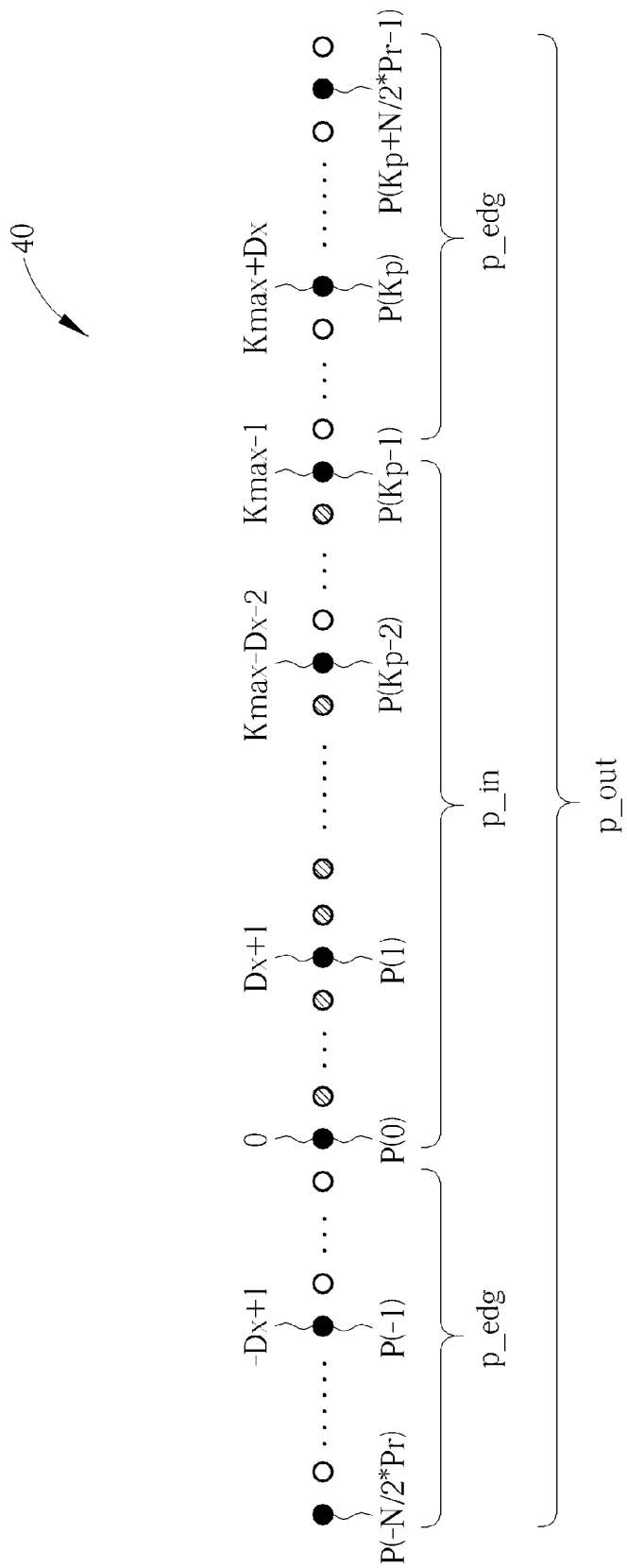
FIG. 4 is a schematic diagram of an arrangement of pilot subcarriers according to an example of the present invention.

Please refer to FIG. 4, which is a schematic diagram of an arrangement of pilot subcarriers according to an example of the present invention. FIG. 4 is used for illustrating a pilot subcarrier arrangement 40 of pilots p_out outputted by the edge pilot estimation unit 200. As shown in FIG. 4, the pilots p_out include input pilots p_in and edge pilots p_edg in guard bands. Preferably, the number of the edge pilots p_edg is Pr·N (i.e., there are Pr·N/2 pilots in each of the two guard bands), wherein N is a complexity parameter, Pr=Du/Dx is a pilot interval ratio, and Du is a used pilot interval (e.g., a positive integer such as 3, 6, 12, etc.). Please note that, the parameters and relations between the parameters stated above are simply used for illustrating the present invention, and can be adjusted according to system requirements and design considerations. For example, a parameter can be increased/decreased by a constant, and/or can be multiplied/divided by another constant. Besides, the complexity parameter N can be related to (e.g., fraction of, multiple of, approximated to, or equal to) a number of multipliers (e.g., installed or used) in the frequency-domain interpolator, and is not limited herein.

Figure 5:
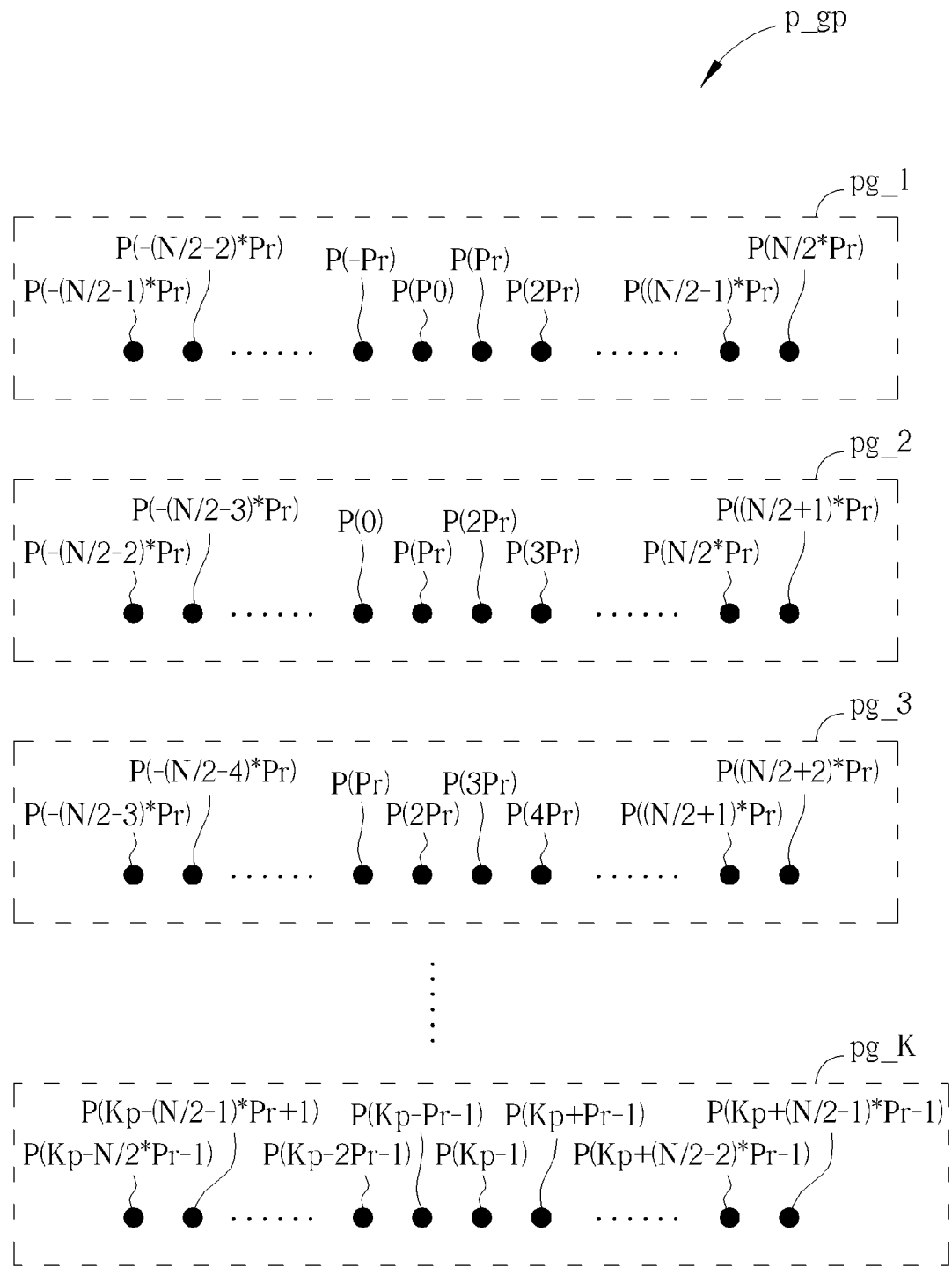
FIG. 5 is a schematic diagram of an arrangement of pilot groups according to an example of the present invention.

Then, the first selection unit 202 selects a plurality of pilot groups p_gp from the pilots p_out according to the pilot interval ratio Pr and the complexity parameter N. Please refer to FIG. 5, which is a schematic diagram of an arrangement of pilot groups according to an example of the present invention. FIG. 5 is used for illustrating pilot groups p_gp outputted by the first selection unit 202. As shown in FIG. 5, the pilot groups p_gp include pilot groups pg_1-pg_K, wherein each of the pilot groups pg_1-pg_K includes N pilots which are represented by solid circles. Besides, K approximately equals to (Kmax−1−Kp)/Du. That is, each of the pilot groups pg_1-pg_K can be used for estimating channels corresponding to Du data subcarriers. In detail, the pilot group pg_1 is used for estimating channels corresponding to the data subcarriers between the pilot subcarriers P(0) and P(Pr), the pilot group pg_2 is used for estimating channels corresponding to the data subcarriers between the pilot subcarriers P(Pr) and P(2Pr), and the process proceeds to obtain that the pilot group pg_K is used for estimating channels corresponding to the data subcarriers between the pilot subcarriers P(Kp-Pr−1) and P(Kp−1). In other words, each of the pilot groups pg_1-pg_K is used for estimating channels corresponding to the data subcarriers at the middle position, to achieve better performance (e.g., accuracy).

On the other hand, the second selection unit 204 generates a plurality of coefficient groups coef_gp corresponding to a plurality of channels (i.e., channels to be estimated) according to a channel profile (e.g., channel information such as channel delay, etc.,) and a used pilot interval Du, wherein each of the plurality of coefficient groups coef_gp corresponds to a set of the plurality of channels.

Figure 6:
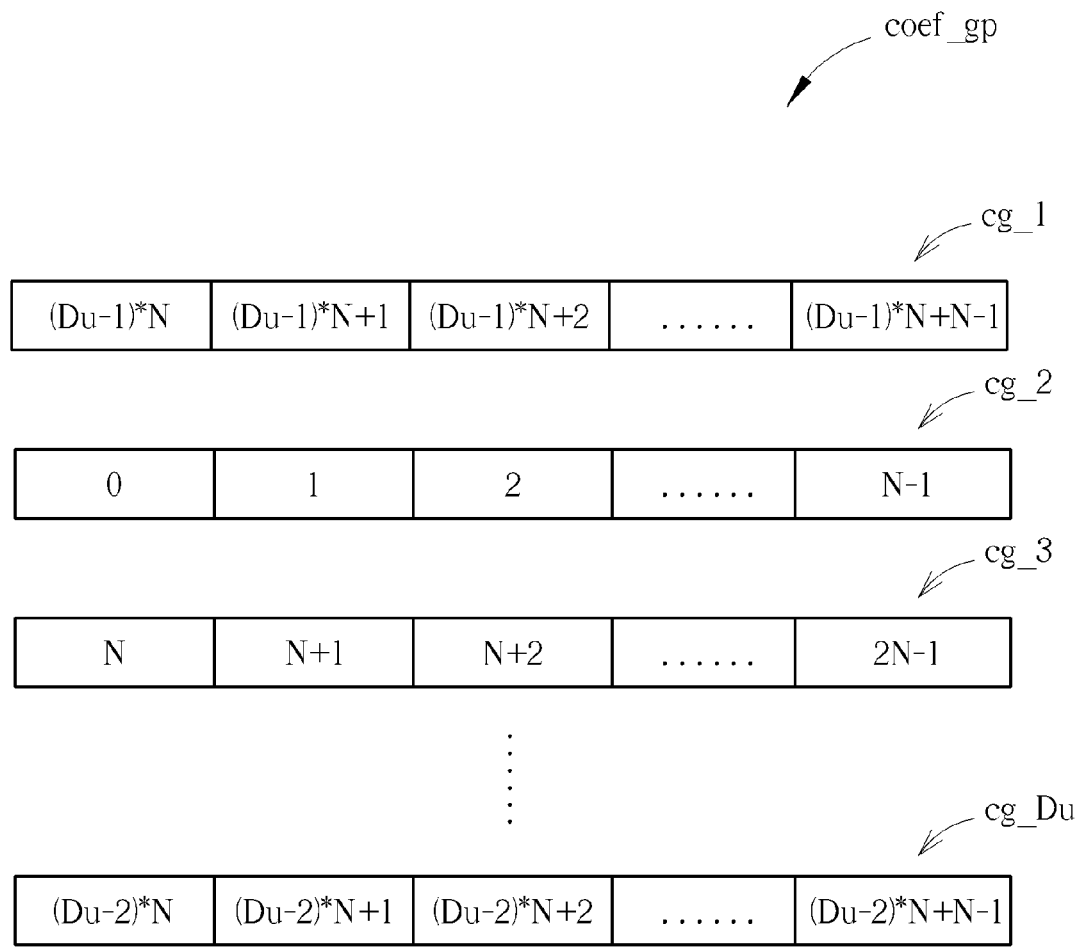
FIG. 6 is a schematic diagram of an arrangement of coefficient groups according to an example of the present invention.

Please refer to FIG. 6, which is a schematic diagram of an arrangement of coefficient groups according to an example of the present invention. FIG. 6 is used for illustrating coefficient groups coef_gp outputted by the second selection unit 204. As shown in FIG. 6, the coefficient groups coef_gp include Du coefficient groups cg_1~cg_Du, wherein each of the coefficient groups cg_1~cg_Du corresponds to a set of channels, and each of the coefficient groups cg_1~cg_Du includes N coefficients. Besides, indices of the coefficients are shown in the respective coefficient group. For example, the coefficient group cg_2 includes the coefficients with the indices 0-(N−1), the coefficient group cg_3 includes the coefficients with the indices N-(2N−1), etc. In detail, the coefficient group cg_1 corresponds to a channel of the first data subcarrier between the pilot subcarriers P(0) and P(Pr), a channel of the first data subcarrier between the pilot subcarriers P(Pr) and P(2Pr), . . . , a channel of the first data subcarrier between the pilot subcarriers P(Kp-Pr−1) and P(Kp−1). Besides, the coefficient group cg_2 corresponds to a channel of the second data subcarrier between the pilot subcarriers P(0) and P(Pr), a channel of the second data subcarrier between the pilot subcarriers P(Pr) and P(2Pr), . . . , a channel of the second data subcarrier between the pilot subcarriers P(Kp-Pr−1) and P(Kp−1). The process proceeds to obtain that the coefficient group cg_Du corresponds to a channel of the (Du)th data subcarrier between the pilot subcarriers P(0) and P(Pr), a channel of the (Du)th data subcarrier between the pilot subcarriers P(Pr) and P(2Pr), . . . , a channel of the (Du)th data subcarrier between the pilot subcarriers P(Kp-Pr−1) and P(Kp−1). Please note that, the channel profile and the used pilot interval Du are used for determining the coefficient groups coef_gp, e.g., the second selection unit 204 selects corresponding coefficient groups coef_gp from the storage unit 208 according to the channel profile and the used pilot interval Du. On the other hand, as shown in FIG. 6, the indices of the coefficients start from (Du−1)·N, i.e., not start from 0, to simplify the hardware implementation. However, this is not a restriction for realizing the present invention, and can be adjusted according to the system requirements and the design considerations, and is not limited herein.

Then, the filter unit 206 receives the pilot groups p_gp and the coefficient groups coef_gp (in one or multiple times), to generate a plurality of channels ch_est according to the pilot groups p_gp, the coefficient groups coef_gp, and a relation between the pilot groups p_gp and the coefficient groups coef_gp. In detail, the filter unit 206 uses the pilot group pg_1 and the coefficient groups cg_1~cg_Du for generating the channels of the Du data subcarriers between the pilot subcarriers P(0) and P(Pr), respectively. Besides, the filter unit 206 uses the pilot group pg_2 and the coefficient groups cg_1~cg_Du for generating the channels of the Du data subcarriers between the pilot subcarriers P(Pr) and P(2Pr), respectively. The process proceeds to obtain that the filter unit 206 uses the pilot group pg_K and the coefficient groups cg_1~cg_Du for generating the channels of the Du data subcarriers between the pilot subcarriers P(Kp-Pr−1) and P(Kp−1), respectively. Thus, the filter unit 206 can generate (i.e., output) all the channels ch_est corresponding to the data subcarriers.

Figure 7:
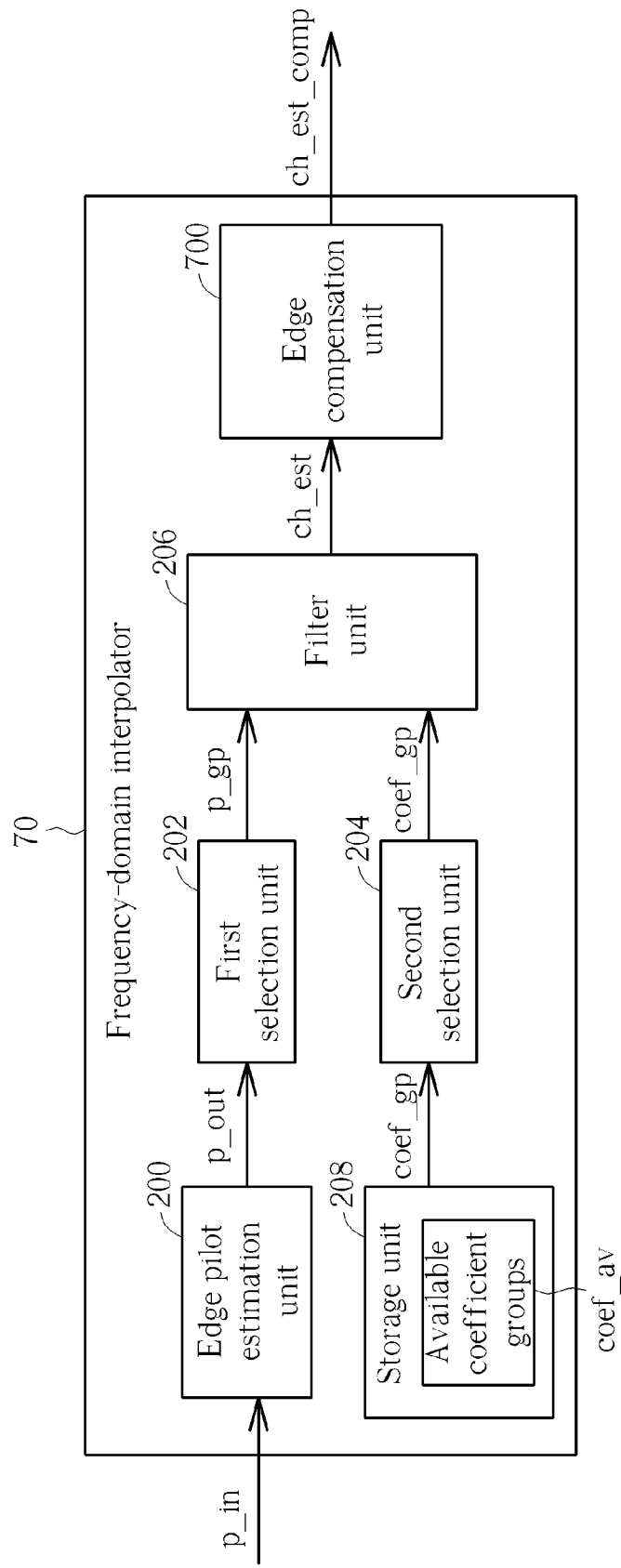
FIG. 7 is a schematic diagram of a frequency-domain interpolator according to an example of the present invention.

In general, performance of the channels of the data subcarriers at the edge is worse than performance of the other channels. Thus, if the channels of the data subcarriers at the edge are compensated, throughput of the communication system can be improved. Please refer to FIG. 7, which is a schematic diagram of a frequency-domain interpolator 70 according to an example of the present invention. The frequency-domain interpolator 70 can be used in the receiver RX in FIG. 1, for performing frequency-domain interpolation in channel estimation. Comparing with the frequency-domain interpolator 20 in FIG. 2, an edge compensation unit 700 is added in the frequency-domain interpolator 70. Functions and connections of the rest components are the same as those in the frequency-domain interpolator 20, and are not narrated herein. In detail, the edge compensation unit 700 is coupled to the filter unit 206, and performs linear interpolation on a plurality of channels of edge subcarriers of the plurality of subcarriers, to compensate the plurality of channels of the edge subcarriers. Thus, estimated channels ch_est_comp with better accuracy (e.g., lower mean squared error (MSE)) can be obtained. For example, for a specific edge subcarrier, the linear interpolation can be performed on neighboring subcarriers of the specific edge subcarrier, to improve accuracy of an estimated channel of the specific edge subcarrier. Further, the edge subcarriers can be defined as the data subcarriers with indices 0-K1 and indices K2-(Kmax-1), wherein the indices K1 and K2 can be adjusted according to the system requirements and the design considerations.

Figure 8:
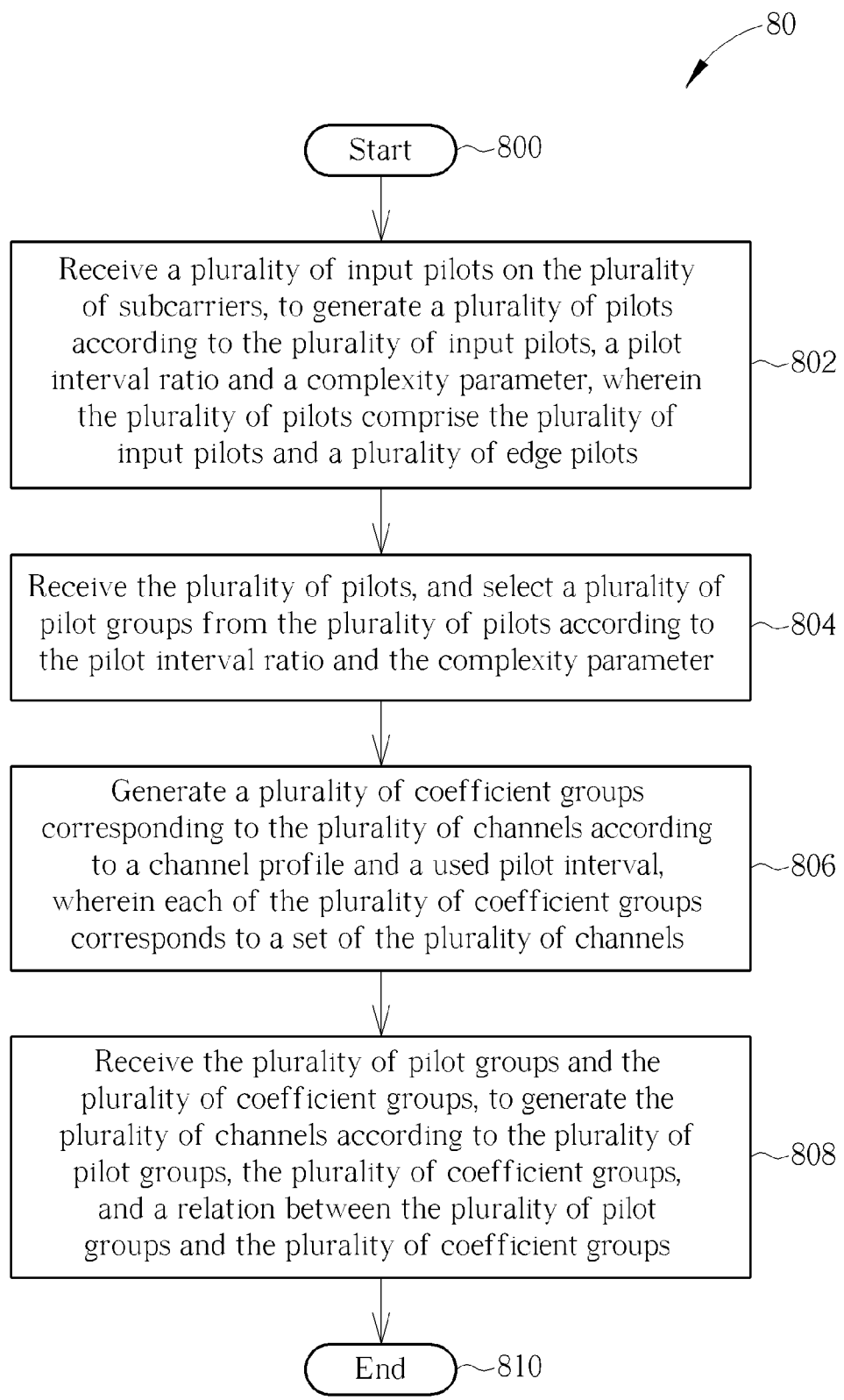
FIG. 8 is a flowchart of a process according to an example of the present invention.

According to the above description, operations of the frequency-domain interpolator 20 can be summarized into a process 80 as shown in FIG. 8. The process 80 includes the following steps:

Step 800: Start.

Step 802: Receive a plurality of input pilots on the plurality of subcarriers, to generate a plurality of pilots according to the plurality of input pilots, a pilot interval ratio and a complexity parameter, wherein the plurality of pilots comprise the plurality of input pilots and a plurality of edge pilots.

Step 804: Receive the plurality of pilots, and select a plurality of pilot groups from the plurality of pilots according to the pilot interval ratio and the complexity parameter.

Step 806: Generate a plurality of coefficient groups corresponding to the plurality of channels according to a channel profile and a used pilot interval, wherein each of the plurality of coefficient groups corresponds to a set of the plurality of channels.

Step 808: Receive the plurality of pilot groups and the plurality of coefficient groups, to generate the plurality of channels according to the plurality of pilot groups, the plurality of coefficient groups, and a relation between the plurality of pilot groups and the plurality of coefficient groups.

Step 810: End.

Operations and variations of the process 80 can be referred to the above illustration, and are not narrated herein.

Figure 9:
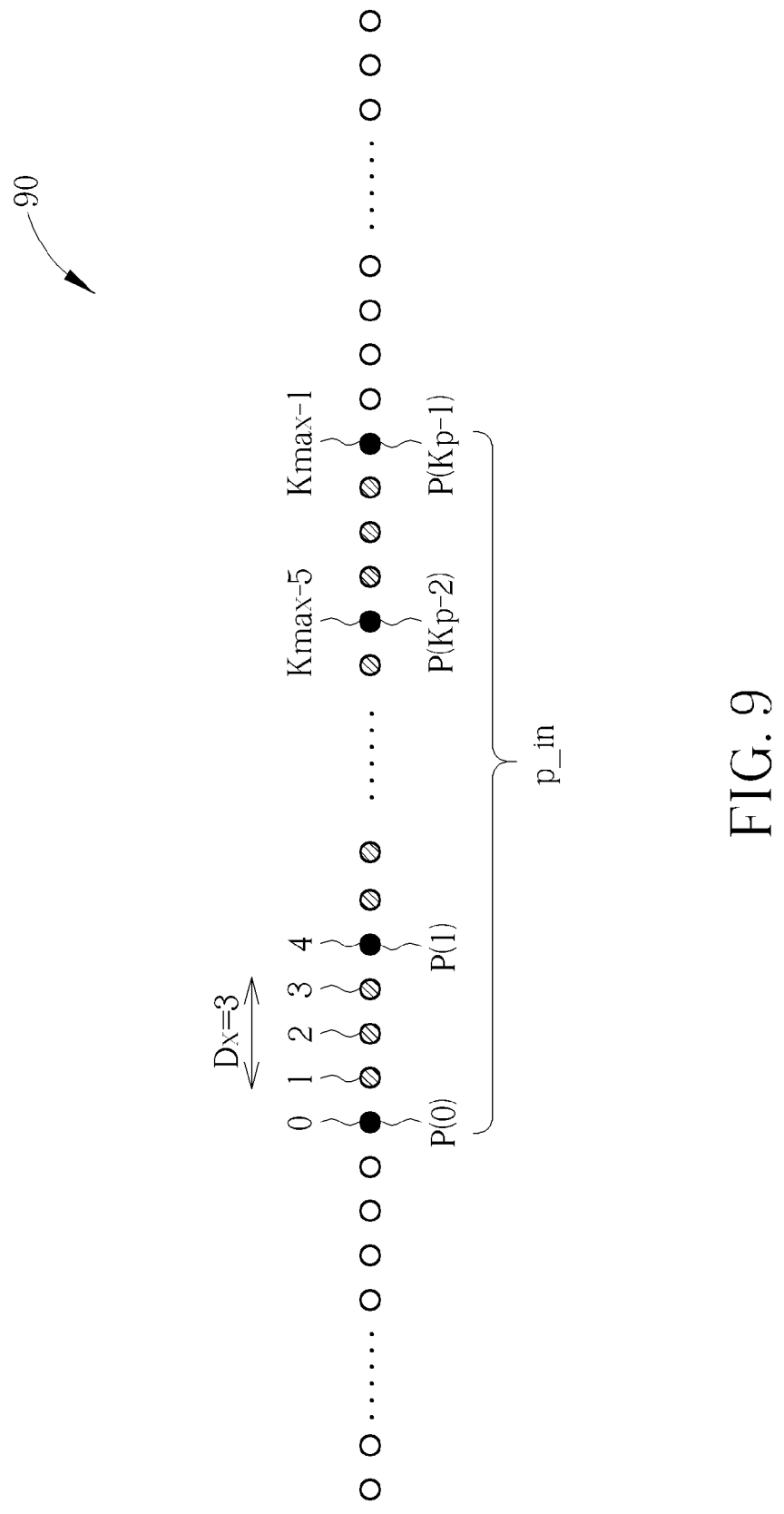
FIG. 9 is a schematic diagram of an arrangement of subcarriers according to an example of the present invention.

In the following, an example of Dx=3 and Du=6 (i.e., Pr=2) is used for illustrating the pilot arrangements, the coefficient groups, and correspondence between the pilot arrangements and the coefficient groups which are described above. Please refer to FIG. 9, which is a schematic diagram of an arrangement of subcarriers according to an example of the present invention. FIG. 9 is used for illustrating a subcarrier arrangement 90 of an OFDM signal. Similar to FIG. 3, the OFDM signal includes Kmax available subcarriers and unused subcarriers which are both represented by circles, wherein 0~Kmax-1 are indices of the available subcarriers. In detail, subcarriers (i.e., data subcarriers) used for arranging data are represented by circles filled with grid lines, and subcarriers (i.e., pilot subcarriers P(0)-P(Kp-1)) used for arranging Kp pilots p_in are represented by solid circles, wherein P(0)-P(Kp-1) are indices of the pilot subcarriers. Besides, unused subcarriers in guard bands are represented by empty circles. Thus, a relation between the indices of the pilot subcarriers and the indices of the available subcarriers can be represented as follows: P(0)=0, P(1)=4, P(2)=8, . . . , P(Kp-1)=Kmax-1. According to the above description, when the transmitter TX prepares to transmit the OFDM signal composed of the subcarriers to the receiver RX, the transmitter TX can arrange the pilots and the data on the subcarriers according to the subcarrier arrangement 90. Correspondingly, the receiver RX processes the pilots and the data on the subcarriers according to the subcarrier arrangement 90.

Please note that, the transmitter TX does not need to start from the 0th subcarrier when arranging the pilots, i.e., P(0) may not be 0. On the other hand, the last pilot may not be arranged on the last available subcarrier, i.e., P(Kp-1) may not be (Kmax-1), according to a relation between Kmax and Dx, e.g., whether (Kmax-1) is divisible by 4 (i.e., Dx+1). Considering the subcarrier arrangement 90, since the pilots are arranged on both the first subcarrier (with the index 0) and the last subcarrier (with the index (Kmax-1)), it can be inferred that (Kmax-1) is divisible by 4.

After the OFDM signal is received and processed by front-end components of the receiver RX, the edge pilot estimation unit 200 can obtain the pilots on the pilot subcarriers P(0)-P(Kp-1), i.e., the plurality of input pilots p_in shown in FIG. 9. Then, the edge pilot estimation unit 200 generates the plurality of pilots p_out according to the plurality of input pilots p_in, the pilot interval ratio and the complexity parameter.

Figure 10:
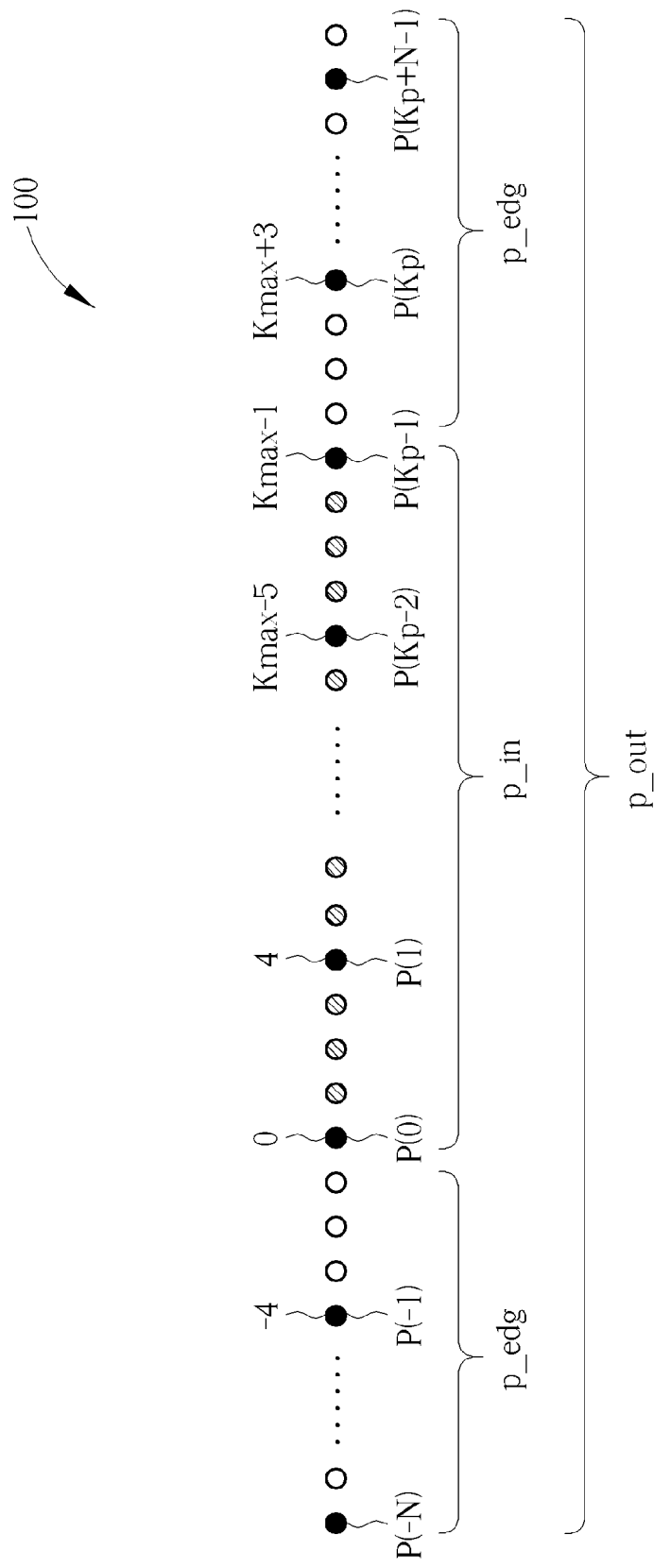
FIG. 10 is a schematic diagram of an arrangement of pilot subcarriers according to an example of the present invention.

Please refer to FIG. 10, which is a schematic diagram of an arrangement of pilot subcarriers according to an example of the present invention. FIG. 10 is used for illustrating a pilot subcarrier arrangement 100 of pilots p_out outputted by the edge pilot estimation unit 200. As shown in FIG. 10, the pilots p_out include input pilots p_in and edge pilots p_edg in guard bands. Preferably, a number of the edge pilots p_edg is 2N (i.e., there are N pilots in each of the two guard bands), wherein N is a complexity parameter. Please note that, the parameters and a relation between the parameters stated above are simply used for illustrating the present invention, and can be adjusted according to system requirements and design considerations. For example, a parameter can be increased/decreased by a constant, and/or can be multiplied/divided by another constant. Besides, the complexity parameter N can be related to (e.g., fraction of, multiple of, approximated to, or equal to) a number of multipliers (e.g., installed or used) in the frequency-domain interpolator, and is not limited herein.

Figure 11:
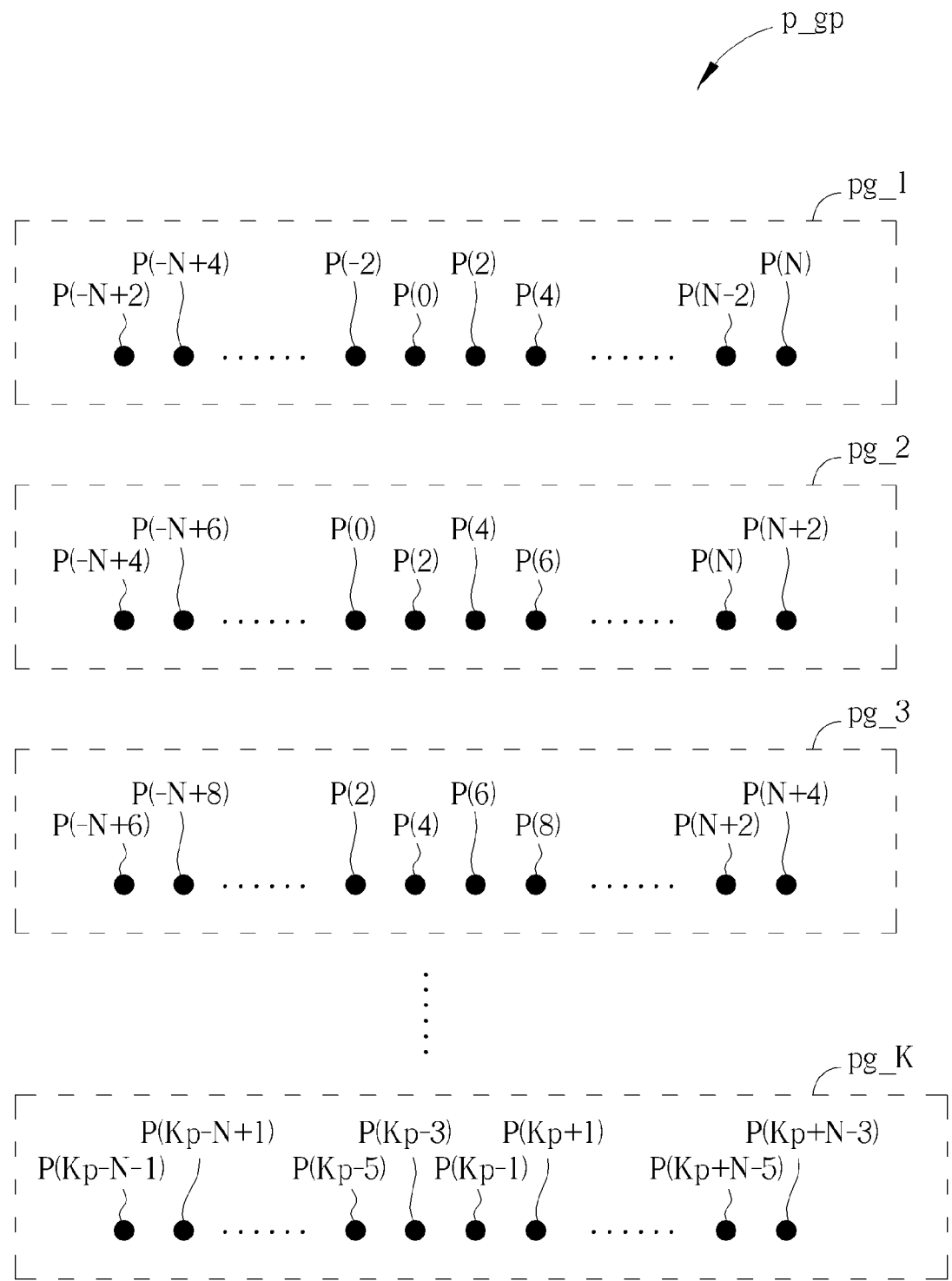
FIG. 11 is a schematic diagram of an arrangement of pilot groups according to an example of the present invention.

Then, the first selection unit 202 selects a plurality of pilot groups p_gp from the pilots p_out according to the pilot interval ratio 2 and the complexity parameter N. Please refer to FIG. 11, which is a schematic diagram of an arrangement of pilot groups according to an example of the present invention. FIG. 11 is used for illustrating pilot groups p_gp outputted by the first selection unit 202. As shown in FIG. 11, the pilot groups p_gp include pilot groups pg_1-pg_K, wherein each of the pilot groups pg_1-pg_K include N pilots which are represented by solid circles. Besides, K approximately equals to (Kmax-1-Kp)/6. That is, each of the pilot groups pg_1-pg_K can be used for estimating channels corresponding to 6 data subcarriers. In detail, the pilot group pg_1 is used for estimating channels corresponding to 6 data subcarriers between the pilot subcarriers P(0) and P(2) (i.e., the data subcarriers with indices 1, 2, 3, 5, 6 and 7), the pilot group pg_2 is used for estimating channels corresponding to 6 data subcarriers between the pilot subcarriers P(2) and P(4) (i.e., the data subcarriers with indices 9, 10, 11, 13, 14 and 15), and the process proceeds to obtain that the pilot group pg_K is used for estimating channels corresponding to 6 data subcarriers between the pilot subcarriers P(Kp-3) and P(Kp-1).

Figure 12:
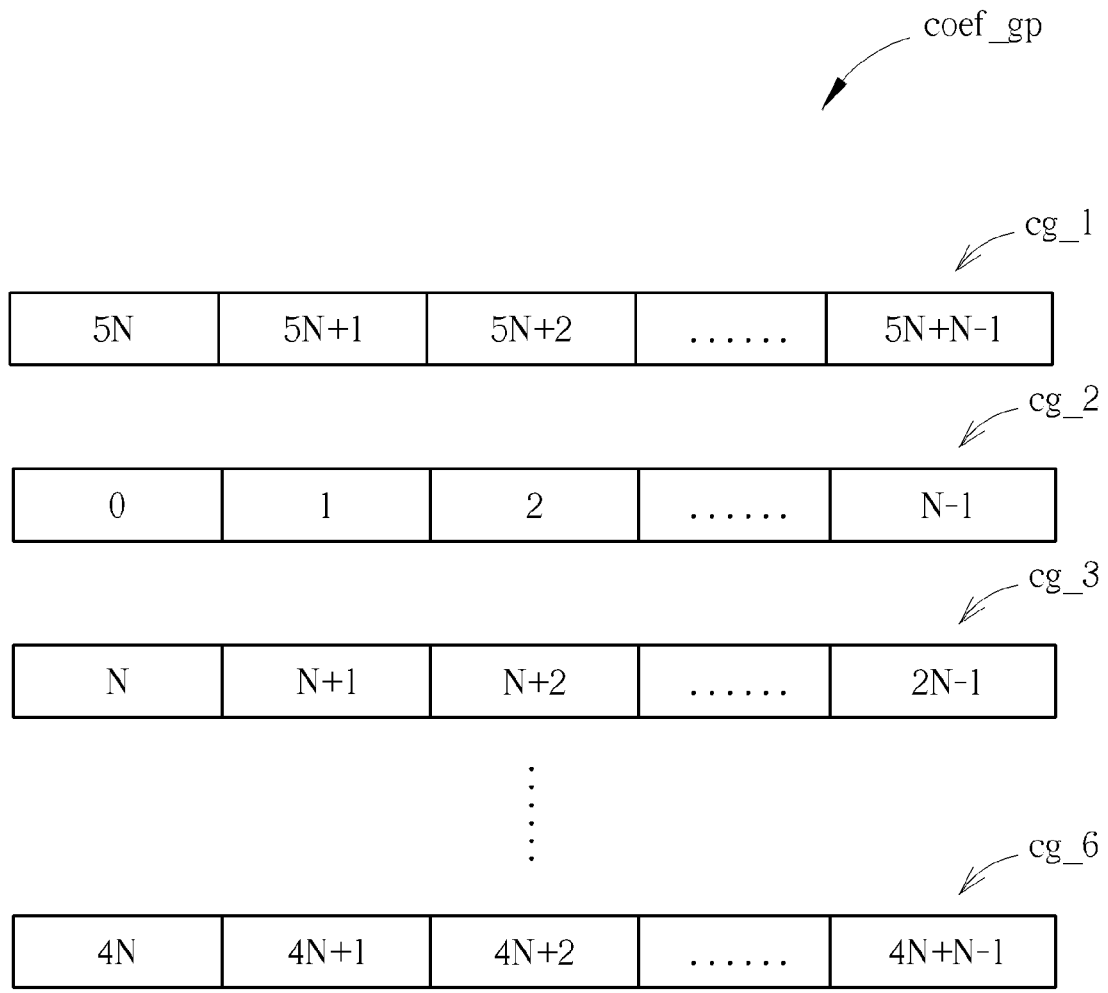
FIG. 12 is a schematic diagram of an arrangement of coefficient groups according to an example of the present invention.

On the other hand, the second selection unit 204 generates a plurality of coefficient groups coef_gp corresponding to a plurality of channels (i.e., channels to be estimated) according to a channel profile (e.g., channel information such as channel delay, etc.,) and a used pilot interval 6, wherein each of the plurality of coefficient groups coef_gp corresponds to a set of the plurality of channels. Please refer to FIG. 12, which is a schematic diagram of an arrangement of coefficient groups according to an example of the present invention. FIG. 12 is used for illustrating coefficient groups coef_gp outputted by the second selection unit 204. As shown in FIG. 12, the coefficient groups coef_gp include 6 coefficient groups cg_1·cg_6, wherein each of the coefficient groups cg_1~cg_6 corresponds to a set of channels, and each of the coefficient groups cg_1~cg_6 includes N coefficients. Besides, indices of the coefficients are shown in the respective coefficient group. For example, the coefficient group cg_2 includes the coefficients with the indices 0-(N−1), the coefficient group cg_3 includes the coefficients with the indices N-(2N−1), etc. In detail, the coefficient group cg_1 corresponds to a channel of the first data subcarrier (with the subcarrier index 1) between the pilot subcarriers P(0) and P(2), a channel of the first data subcarrier (with the subcarrier index 9) between the pilot subcarriers P(2) and P(4), . . . , a channel of the first data subcarrier between the pilot subcarriers P(Kp−3) and P(Kp−1). Besides, the coefficient group cg_2 corresponds to a channel of the second data subcarrier (with the subcarrier index 2) between the pilot subcarriers P(0) and P(2), a channel of the second data subcarrier (with the subcarrier index 10) between the pilot subcarriers P(2) and P(4), . . . , a channel of the second data subcarrier between the pilot subcarriers P(Kp−3) and P(Kp−1). The process proceeds to obtain that the coefficient group cg_6 corresponds to a channel of the 6th data subcarrier (with the subcarrier index 7) between the pilot subcarriers P(0) and P(2), a channel of the 6th data subcarrier (with the subcarrier index 15) between the pilot subcarriers P(2) and P(4), . . . , a channel of the 6th data subcarrier between the pilot subcarriers P(Kp−3) and P(Kp−1).

Then, the filter unit 206 receives the pilot groups p_gp and the coefficient groups coef_gp (in one or multiple times), to generate a plurality of channels ch_est according to the pilot groups p_gp, the coefficient groups coef_gp, and a relation between the pilot groups p_gp and the coefficient groups coef_gp. In detail, the filter unit 206 uses the pilot group pg_1 and the coefficient groups cg_1~cg_6 for generating the channels of the 6 data subcarriers (with the subcarriers indices 1, 2, 3, 5, 6 and 7) between the pilot subcarriers P(0) and P(2), respectively. That is, the pilot group pg_1 and the coefficient group cg_1 are used for generating the channel of the data subcarrier with the subcarrier index 1, the pilot group pg_1 and the coefficient group cg_2 are used for generating the channel of the data subcarrier with the subcarrier index 2, the pilot group pg_1 and the coefficient group cg_3 are used for generating the channel of the data subcarrier with the subcarrier index 3, and so on. Similarly, the filter unit 206 uses the pilot group pg_2 and the coefficient groups cg_1~cg_6 for generating the channels of the 6 data subcarriers (with the subcarriers indices 9, 10, 11, 13, 14 and 15) between the pilot subcarriers P(2) and P(4), respectively. The process proceeds to obtain that the filter unit 206 uses the pilot group pg_K and the coefficient groups cg_1~cg_6 for generating the channels of the 6 data subcarriers between the pilot subcarriers P(Kp−3) and P(Kp−1), respectively. Thus, the filter unit 206 can generate (i.e., output) all the channels ch_est corresponding to the data subcarriers.

To sum up, the present invention provides a frequency-domain interpolation method and a frequency-domain interpolator, to realize frequency-domain interpolation with lower complexity (hardware cost) and better performance. Problem of trading between the complexity and the cost is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A frequency-domain interpolator, utilized in a receiver of an orthogonal frequency-division multiplexing (OFDM) system, for estimating a plurality of channels corresponding to a plurality of subcarriers, the frequency-domain interpolator comprising:
   an edge pilot estimation unit, for receiving a plurality of input pilots on the plurality of subcarriers, to generate a plurality of pilots according to the plurality of input pilots, a pilot interval ratio and a complexity parameter, wherein the plurality of pilots comprise the plurality of input pilots and a plurality of edge pilots;
   a first selection unit, coupled to the edge pilot estimation unit, for receiving the plurality of pilots, to select a plurality of pilot groups from the plurality of pilots according to the pilot interval ratio and the complexity parameter;
   a second selection unit, for generating a plurality of coefficient groups corresponding to the plurality of channels according to a channel profile and a used pilot interval, wherein each of the plurality of coefficient groups corresponds to a set of the plurality of channels; and
   a filter unit, coupled to the first selection unit and the second selection unit, for receiving the plurality of pilot groups and the plurality of coefficient groups, to generate the plurality of channels according to the plurality of pilot groups, the plurality of coefficient groups, and a relation between the plurality of pilot groups and the plurality of coefficient groups.

2. The frequency-domain interpolator of claim 1, wherein the pilot interval ratio is a ratio of the used pilot interval to an actual pilot interval, wherein the used pilot interval is greater than or equal to the actual pilot interval.

3. The frequency-domain interpolator of claim 1, wherein a number of the plurality of pilot groups is a ratio of a number of the plurality of channels to the used pilot interval, and a number of pilots of each of the plurality of pilot groups is related to the complexity parameter.

4. The frequency-domain interpolator of claim 1, wherein the filter unit uses each of the plurality of pilot groups and the plurality of coefficient groups, for generating a set of channels corresponding to each set of the plurality of subcarriers, respectively, wherein each of the set of channels corresponds to each of the plurality of coefficient groups, respectively.

5. The frequency-domain interpolator of claim 1, wherein an interval between neighboring pilots in each of the plurality of pilot groups is the pilot interval ratio.

6. The frequency-domain interpolator of claim 1, wherein a number of the plurality of coefficient groups is the used pilot interval, and a number of each of the plurality of coefficient groups is related to the complexity parameter.

7. The frequency-domain interpolator of claim 1, wherein the complexity parameter is related to a number of multipliers in the frequency-domain interpolator.

8. The frequency-domain interpolator of claim 1, further comprising:
   a storage unit, coupled to the second selection unit, for storing available coefficient groups, for the second selection unit to select the plurality of coefficient groups from the available coefficient groups according to the channel profile and the used pilot interval.

9. The frequency-domain interpolator of claim 1, further comprising:
   an edge compensation unit, coupled to the filter unit, for performing linear interpolation on a plurality of channels of edge subcarriers of the plurality of subcarriers, to compensate the plurality of channels of the edge subcarriers.

10. A method of handling frequency-domain interpolation, utilized in a receiver of an orthogonal frequency-division multiplexing (OFDM) system, for estimating a plurality of channels corresponding to a plurality of subcarriers, the method comprising:
receiving a plurality of input pilots on the plurality of subcarriers, to generate a plurality of pilots according to the plurality of input pilots, a pilot interval ratio and a complexity parameter, wherein the plurality of pilots comprise the plurality of input pilots and a plurality of edge pilots;
receiving the plurality of pilots, and selecting a plurality of pilot groups from the plurality of pilots according to the pilot interval ratio and the complexity parameter;
generating a plurality of coefficient groups corresponding to the plurality of channels according to a channel profile and a used pilot interval, wherein each of the plurality of coefficient groups corresponds to a set of the plurality of channels; and
receiving the plurality of pilot groups and the plurality of coefficient groups, to generate the plurality of channels according to the plurality of pilot groups, the plurality of coefficient groups, and a relation between the plurality of pilot groups and the plurality of coefficient groups.

11. The method of claim 10, wherein the pilot interval ratio is a ratio of the used pilot interval to an actual pilot interval, wherein the used pilot interval is greater than or equal to the actual pilot interval.

12. The method of claim 10, wherein a number of the plurality of pilot groups is a ratio of a number of the plurality of channels to the used pilot interval, and a number of pilots of each of the plurality of pilot groups is related to the complexity parameter.

13. The method of claim 10, wherein the step of receiving the plurality of pilot groups and the plurality of coefficient groups, to generate the plurality of channels according to the plurality of pilot groups, the plurality of coefficient groups, and the relation between the plurality of pilot groups and the plurality of coefficient groups comprises:
using each of the plurality of pilot groups and the plurality of coefficient groups, for generating a set of channels corresponding to each set of the plurality of subcarriers, respectively, wherein each of the set of channels corresponds to each of the plurality of coefficient groups, respectively.

14. The method of claim 10, wherein an interval between neighboring pilots in each of the plurality of pilot groups is the pilot interval ratio.

15. The method of claim 10, wherein a number of the plurality of coefficient groups is the used pilot interval, and a number of each of the plurality of coefficient groups is related to the complexity parameter.

16. The method of claim 10, wherein the complexity parameter is related to a number of multipliers in the frequency-domain interpolation.

17. The method of claim 10, wherein the step of generating the plurality of coefficient groups corresponding to the plurality of channels according to the channel profile and the used pilot interval comprises:
selecting the plurality of coefficient groups from available coefficient groups according to the channel profile and the used pilot interval.

18. The method of claim 10, further comprising:
performing linear interpolation on a plurality of channels of edge subcarriers of the plurality of subcarriers, to compensate the plurality of channels of the edge subcarriers.

* * * * *